US011594714B2

(12) United States Patent
Bonhomme et al.

(10) Patent No.: US 11,594,714 B2
(45) Date of Patent: Feb. 28, 2023

(54) DIRECT COATING OF ELECTRODES IN SILICON-DOMINANT ANODE CELLS

(71) Applicant: Enevate Corporation, Irvine, CA (US)

(72) Inventors: Fred Bonhomme, Irvine, CA (US); Benjamin Park, Irvine, CA (US); Kirk Shockley, Irvine, CA (US); Giulia Canton, Irvine, CA (US); David J. Lee, Irvine, CA (US)

(73) Assignee: ENEVATE CORPORATION, Irvine, CA (US)

( * ) Notice: Subject to any disclaimer, the term of this patent is extended or adjusted under 35 U.S.C. 154(b) by 0 days.

(21) Appl. No.: 17/321,085

(22) Filed: May 14, 2021

(65) Prior Publication Data

US 2021/0273213 A1 Sep. 2, 2021

Related U.S. Application Data

(63) Continuation of application No. 16/683,241, filed on Nov. 13, 2019.

(Continued)

(51) Int. Cl.
*H01M 4/04* (2006.01)
*H01M 4/1395* (2010.01)

(Continued)

(52) U.S. Cl.
CPC ....... *H01M 4/0471* (2013.01); *H01M 4/0404* (2013.01); *H01M 4/0409* (2013.01);

(Continued)

(58) Field of Classification Search
CPC .................................................. H01M 4/0471
See application file for complete search history.

(56) References Cited

U.S. PATENT DOCUMENTS 4,113,240 A * 9/1978 Klein ...................... B22F 3/003 419/57
6,371,995 B1 * 4/2002 Yasunami ......... H01M 10/0587 429/324

(Continued)

OTHER PUBLICATIONS

Arcila-Veiez et al. “Roll-to-roll synthesis of vertically aligned carbon nanotube electrodes for electrical double layer capacitors” Nano Energy, vol. 8, Sep. 2014. pp. 9-16; May 20, 2014; entire document; especially p. 10 (online) < https://www.sciencedirect.com/science/article/pii/S2211285514000809 >.

(Continued)

*Primary Examiner* — Austin Murata

(74) *Attorney, Agent, or Firm* — McAndrews, Held & Malloy, Ltd.

(57) ABSTRACT

Systems and methods are provided for high volume roll-to-roll direct coating of electrodes for silicon-dominant anode cells and may include applying a slurry to a current collector film, the slurry comprising silicon particles and a binder material; drying the slurry to form a precursor composite film; rolling the current collector film into a precursor composite roll; and applying a heat treatment to the precursor composite film and the current collector film in a nitrogen gas environment, wherein the heat treatment is configured for converting the precursor composite film to a pyrolyzed composite film. The heat treatment may include one or both of: applying the heat treatment to a roll comprising the precursor composite roll in whole; and applying the heat treatment to the current collector film as it is continuously fed from the precursor composite roll.

12 Claims, 13 Drawing Sheets

500
502
501
503
501
502
503

Related U.S. Application Data

(60) Provisional application No. 62/854,935, filed on May 30, 2019.

(51) Int. Cl.

| | |
|---|---|
| ***H01M 4/134*** | (2010.01) |
| ***H01M 4/133*** | (2010.01) |
| ***H01M 4/1393*** | (2010.01) |
| *H01M 4/02* | (2006.01) |

(52) U.S. Cl.
CPC ......... *H01M 4/0435* (2013.01); *H01M 4/133* (2013.01); *H01M 4/134* (2013.01); *H01M 4/1393* (2013.01); *H01M 4/1395* (2013.01); *H01M 2004/027* (2013.01)

(56) References Cited

U.S. PATENT DOCUMENTS

| | | | |
|---|---|---|---|
| 2012/0264075 | A1 | 10/2012 | Wang |
| 2014/0014037 | A1 | 1/2014 | Watanabe et al. |
| 2014/0295068 | A1 | 10/2014 | Nanba et al. |
| 2018/0198114 | A1* | 7/2018 | Bonhomme ........ H01M 4/0404 |
| 2018/0297330 | A1* | 10/2018 | Jeon ..................... C09D 179/08 |
| 2019/0081317 | A1 | 3/2019 | Kell et al. |
| 2021/0094826 | A1* | 4/2021 | Izawa ..................... C01B 32/00 |

OTHER PUBLICATIONS

International Search Report and Written Opinion for PCT/US2020/034873, dated Oct. 21, 2020, 8 pages.

K-PION online publication and machine translation of Lee (10-1771632) (Aug. 2017).

* cited by examiner

DIRECT COATING OF ELECTRODES IN SILICON-DOMINANT ANODE CELLS

CLAIM OF PRIORITY

This patent application is a continuation of U.S. patent application Ser. No. 16/683,241 filed on Nov. 13, 2019, which makes reference to, claims priority to and claims benefit from U.S. Provisional Patent Application Ser. No. 62/854,935, filed on May 30, 2019. Each of the above identified applications is hereby incorporated herein by reference in its entirety.

TECHNICAL FIELD

Aspects of the present disclosure relate to energy generation and storage. More specifically, certain implementations of the present disclosure relate to methods and systems for direct coating of electrodes in silicon-dominant anode cells.

BACKGROUND

Various issues may exist with conventional battery technologies. In this regard, conventional systems and methods, if any existed, for designing and making battery anodes may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for direct coating of electrodes in silicon-dominant anode cells, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
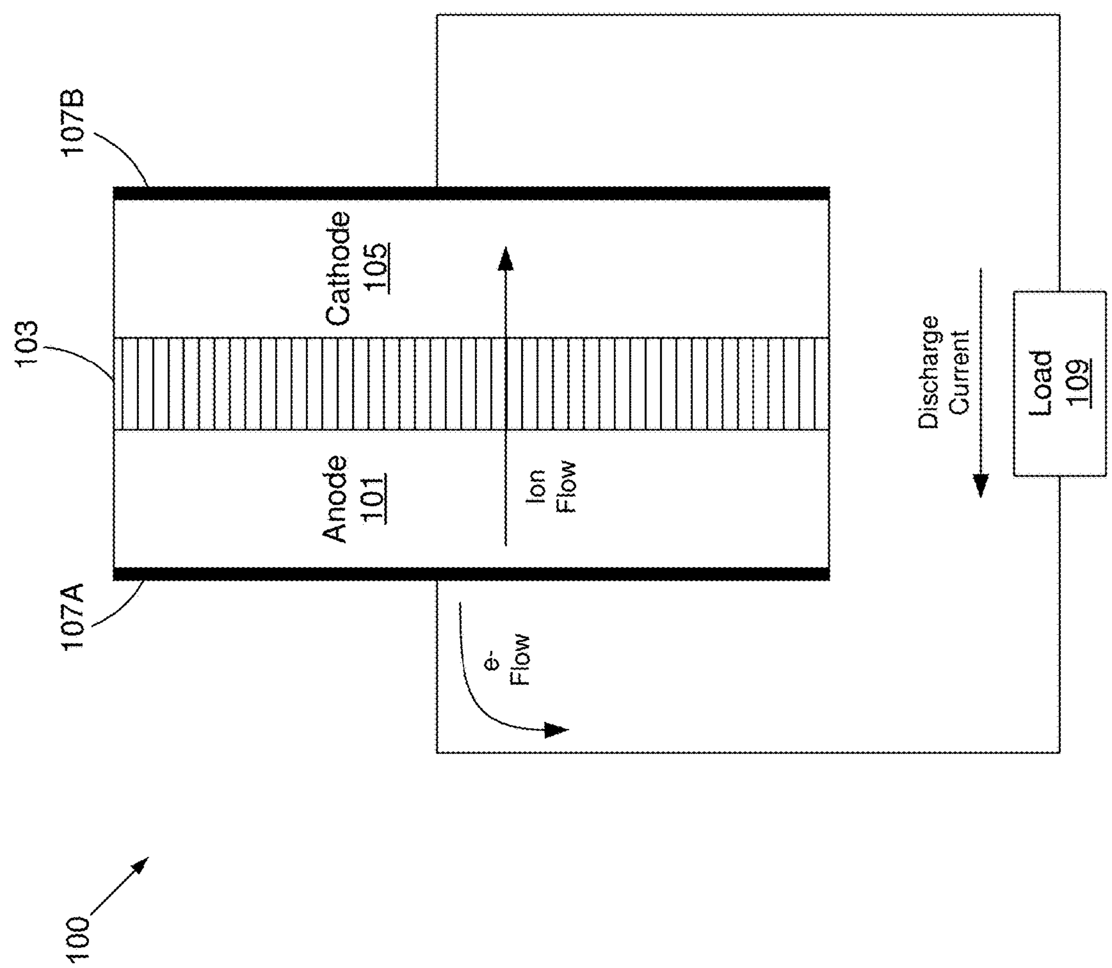
FIG. 1 is a diagram of a battery with a silicon-dominate anode, in accordance with an example embodiment of the disclosure.

FIG. 1 is a diagram of a battery with a silicon-dominate anode, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 1078, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 107 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$, etc. The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Silicon anodes may be formed from silicon composites, with more than 50% silicon, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 1078. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (Super P), vapor grown carbon fibers (VGCF), and a mixture of the two have previously been incorporated separately into the anode electrode resulting in improved performance of the anode. The synergistic interactions between the two carbon materials may facilitate electrical contact throughout the large volume changes of the silicon anode during charge and discharge.

State-of-the-art lithium-ion batteries typically employ a graphite-dominant anode as an intercalation material for lithium. Silicon-dominant anodes, however, offer improvements compared to graphite-dominant Li-ion batteries. Silicon exhibits both higher gravimetric (3579 mAh/g vs. 372 mAh/g for graphite) and volumetric capacities (2194 mAh/L vs. 890 mAh/L for graphite). In addition, silicon-based anodes have a lithiation/delithiation voltage plateau at about 0.3-0.4V vs. $Li/Li^+$, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

Figure 2:
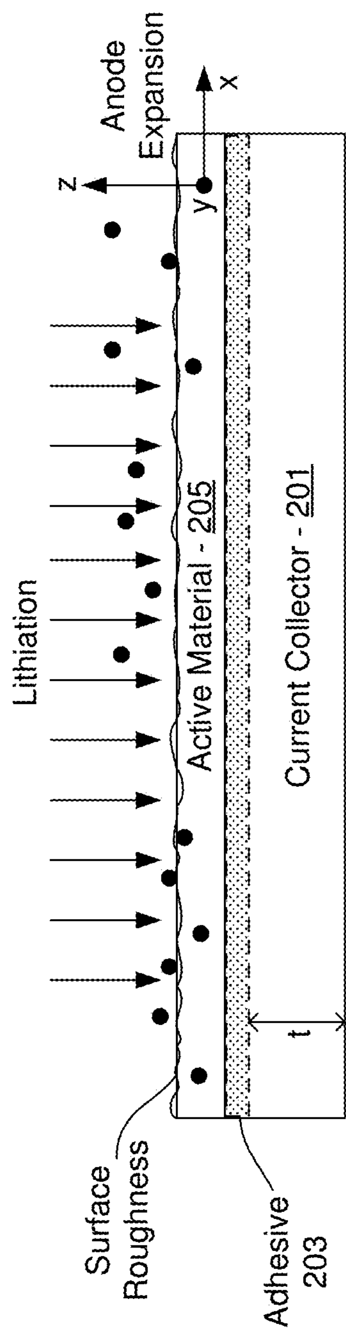
FIG. 2 illustrates an example silicon-dominant anode, in accordance with an example embodiment of the disclosure.

FIG. 2 illustrates an example silicon-dominant anode, in accordance with an example embodiment of the disclosure.

Referring to FIG. 2, there are shown a current collector 201, an optional adhesive 203, and an active material 205. It should be noted, however, that the adhesive 203 may or may not be present, such as depending on the type of anode fabrication process utilized, as the adhesive is not necessarily present in a direct coating process where the active material is formed directly on the current collector.

In an example scenario, the active material 205 comprises silicon particles in a binder material and a solvent, the active material 205 being pyrolyzed to turn the binder into a glassy carbon that provides a structural framework around the silicon particles and also provides electrical conductivity. The active material may be coupled to the current collector 201 using the optional adhesive 203. The current collector 201 may comprise a metal film, such as copper, nickel, or titanium, for example, although other conductive foils may be utilized depending on desired tensile strength. In addition, the current collector 201 may have surface treatment/coating to have rough surface to increase adhesion between the current collector 201 and an active material 205.

FIG. 2 also illustrates lithium particles impinging upon and lithiating the active material 205. As illustrated in FIG. 2, the current collector 201 has a thickness t, which may vary based on the particular implementation. In this regard, in some implementations thicker foils may be used while in other implementations thinner foils are used. Example thicker foils may be greater than 6 μm, such as 10 μm or 20 μm for copper, for example, while thinner foils may be less than 6 μm thick in copper In an example scenario, when an adhesive is used, the adhesive 203 comprises a polymer such as polyimide (PI), polyacrylic acid (PAA) or polyamide-imide (PAI) that provides adhesive strength of the active material film 205 to the current collector 201 while still providing electrical contact to the current collector 201. Other adhesives may be utilized depending on the desired strength, as long as they can provide adhesive strength with sufficient conductivity following processing. If the adhesive 203 is used, it provides a stronger, more rigid bond, the expansion in the x- and y-directions may be more restricted, assuming the current collector is also strong. Conversely, a more flexible and/or thicker adhesive may allow more x-y expansion, reducing the anisotropic nature of the anode expansion.

Figure 3:
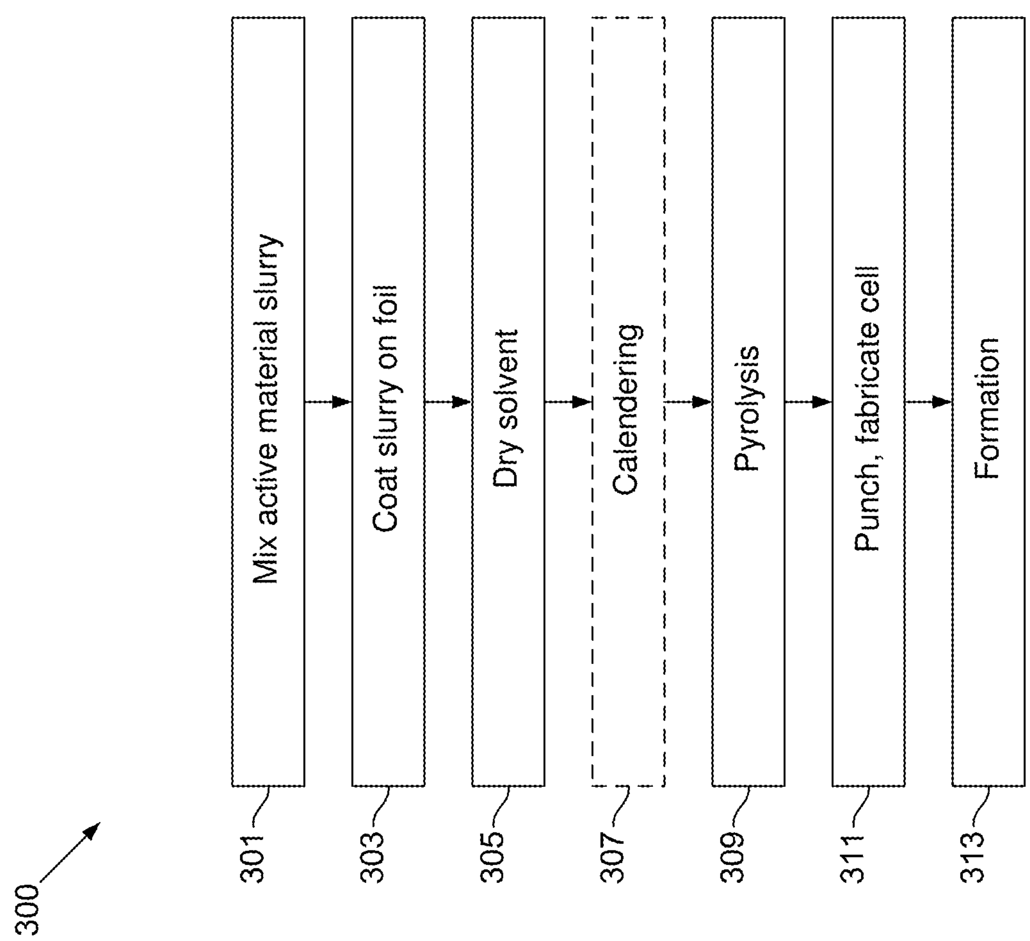
FIG. 3 is a flow diagram of a process for direct coating electrodes, in accordance with an example embodiment of the disclosure.

FIG. 3 is a flow diagram of a process for direct coating electrodes, in accordance with an example embodiment of the disclosure. This process comprises physically mixing the active material, conductive additive, solvent and binder together, and coating it directly on a current collector. This example process comprises a direct coating process in which an anode slurry is directly coated on a copper foil using a binder such as CMC, SBR, Sodium Alginate, PAI, PAA, PI and mixtures and combinations thereof.

In step 301, the raw electrode active material may be mixed using a binder/resin (such as PI, PAI), solvent, and conductive carbon. For example, graphene/VGCF (1:1 by weight) may be dispersed in NMP under sonication for, e.g., 1 hour followed by the addition of Super P (1:1:1 with VGCF and graphene) and additional sonication for, e.g., 45-75 minutes. Silicon powder with a desired particle size, may then be dispersed in polyamic acid resin (15% solids in N-Methyl pyrrolidone (NMP)) at, e.g., 1000 rpm in a ball miller for a designated time, and then the conjugated carbon/NMP slurry may be added and dispersed at, e.g., 2000 rpm for, e.g., another predefined time to achieve a slurry viscosity within 2000-4000 cP and a total solid content of about 30%. The particle size and mixing times may be varied to configure the active material density and/or roughness.

In step 303, the slurry may be coated on the foil at a loading of, e.g., 2-5 mg/cm$^2$, which may undergo drying in step 305 resulting in less than 0-20% residual solvent content. In step 307, an optional calendering process may be utilized where a series of hard pressure rollers may be used to finish the film/substrate into a smoother and denser sheet of material.

In step 309, the active material may be pyrolyzed by heating to 500-800° C. such that carbon precursors are partially or completely converted into glassy carbon. The pyrolysis step may result in an anode active material having silicon content greater than or equal to 50% by weight, where the anode has been subjected to heating at or above 400° C. Pyrolysis can be done either in roll form or before or after punching in step 311. If done in roll form, the punching is done after the pyrolysis process. The punched electrode may then be sandwiched with a separator and cathode with electrolyte to form a cell.

In step 313, the cell may be subjected to a formation process, comprising initial charge and discharge steps to lithiate the anode, with some residual lithium remaining.

In some instances, scaling electrode production may be desirable. Thus, various implementations in accordance with the present disclosure provide processes and corresponding apparatuses configured for high volume electrode production, particularly being configured for a direct coating based process. In this regard, high volume electrode production solutions in accordance with the present disclosure may be used for production of silicon-dominant anodes, based on carbonized polymer as the mechanical structure, in continuous electrode form. Examples of such processes and/or corresponding systems, and related features associated therewith, are described with respect to FIG. 4-13.

Figure 4:
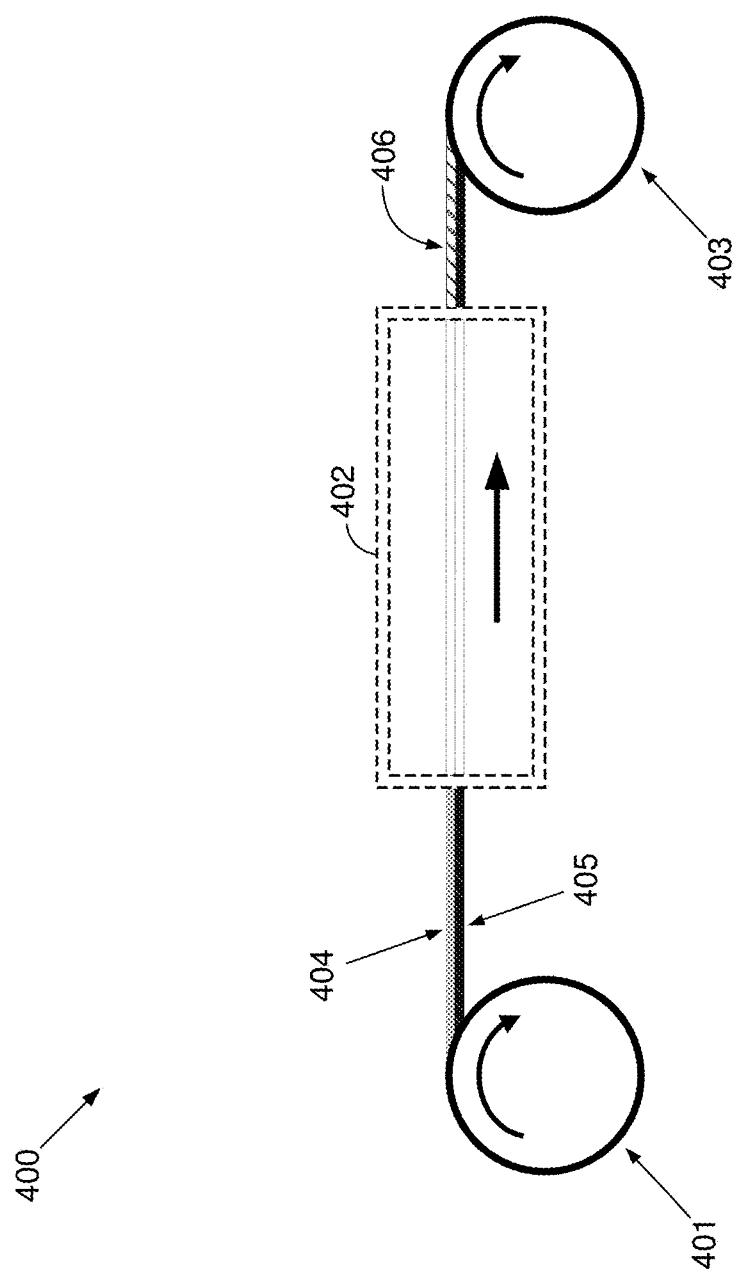
FIG. 4 illustrates a side view of a high volume continuous roll-to-roll heat treatment system, in accordance with an example embodiment of the disclosure.

FIG. 4 illustrates a side view of a high volume continuous roll-to-roll heat treatment system, in accordance with an example embodiment of the disclosure. Shown in FIG. 4 is system 400, which may be used for high volume roll-to-roll electrode direct coating.

In this regard, in some embodiments, high volume roll-to-roll electrode processing may be based on direct coating—this is, where the electrode (or electrode material) is coated directly on the current collector. In other words, in such process the current collector acts as a substrate or carrier film that carries the coated mixture through the manufacturing line, including during heat-treatment (including pyrolysis processing) of the electrode.

An example process for providing high volume electrode direct coating, in accordance with the embodiment illustrated in FIG. 4, may include feeding from precursor composite roll 401, a precursor composite film 404 (comprising, e.g., electrode active material precursor and polymer) on a current collector 405. In this regard, the precursor composite roll 401 may be made by coating electrode mixture on the current collector 405, with the coated electrode mixture forming (e.g., after drying and curing) the precursor composite film 404, and the current collector 405, with the precursor composite film 404 on it, being rolled to from the precursor composite roll 401.

The current collector 405 with the coated precursor composite film 404 is then fed through a heat treat oven 402, to undergo heat treatment (e.g., pyrolysis) of the precursor composite film 404. In this regard, while not specifically shown in FIG. 4, the system 400 may comprise suitable components for engaging the precursor composite roll 401, and for enabling feeding the current collector 405 with the coated precursor composite film 404 from the precursor composite roll 401 into the heat treat oven 402.

The heat treat over 402 may be configured for applying heat treat (e.g., pyrolysis) in a manner that ensures forming the electrode active material—e.g., converting the electrode active material precursor and polymer into the electrode active material. Further, because in direct coating the current collector is also present during the heat treatment, the heat treat oven 402 (and conditions created therein) may be configured particularly for applying the heat treatment in a manner that does not damage the current collector.

As the precursor composite film 404 is fed through the heat treat oven 402, the precursor composite film 404 is pyrolyzed, forming composite electrode film 406, which can be rolled up into a composite electrode roll 403. In this regard, while not specifically shown in FIG. 4, the system 400 may comprise suitable components for engaging the composite electrode roll 403, and for enabling feeding the composite electrode film 406 from the heat treat oven 402 into the composite electrode roll 403.

In some embodiments, heat treat oven 402 is filled with an inert or reducing gas such as argon, nitrogen, helium, 5% hydrogen in argon, 5% hydrogen in nitrogen or a mixture of these or other inert or reducing atmospheres. In some embodiments, the oven 402 may have different temperature zones. In some embodiments, forced or passive cooling may be incorporated into portions of the oven 402 (or atmosphere isolation chambers that may be incorporated into the over 402) to control the cooling rate of the materials. The entrance and exit of the oven 402 may be designed to maintain internal atmosphere described above and prevent outside air from entering the oven. The temperature of the material exiting the oven has to be low enough to prevent oxidation of the current collector.

The coating speed for coating the mixture onto the carrier or the current collector may be between about 1 m/minute to about 100 m/minute, or about 60 m/minute to about 100 m/minute, preferably 80 m/minutes. In some embodiments, the heat treat length is about 12 m to about 18 m, preferably about 14 m, and the amount of time a specific location on the film stays in the heat treat oven is about 1.2 min to about 2 min, preferably about 1.5 min. The heat treatment speed may be about 1 m/min to about 12 m/min, 8 m/min to about 12 m/min, preferably about 10 m/min.

Figure 5:
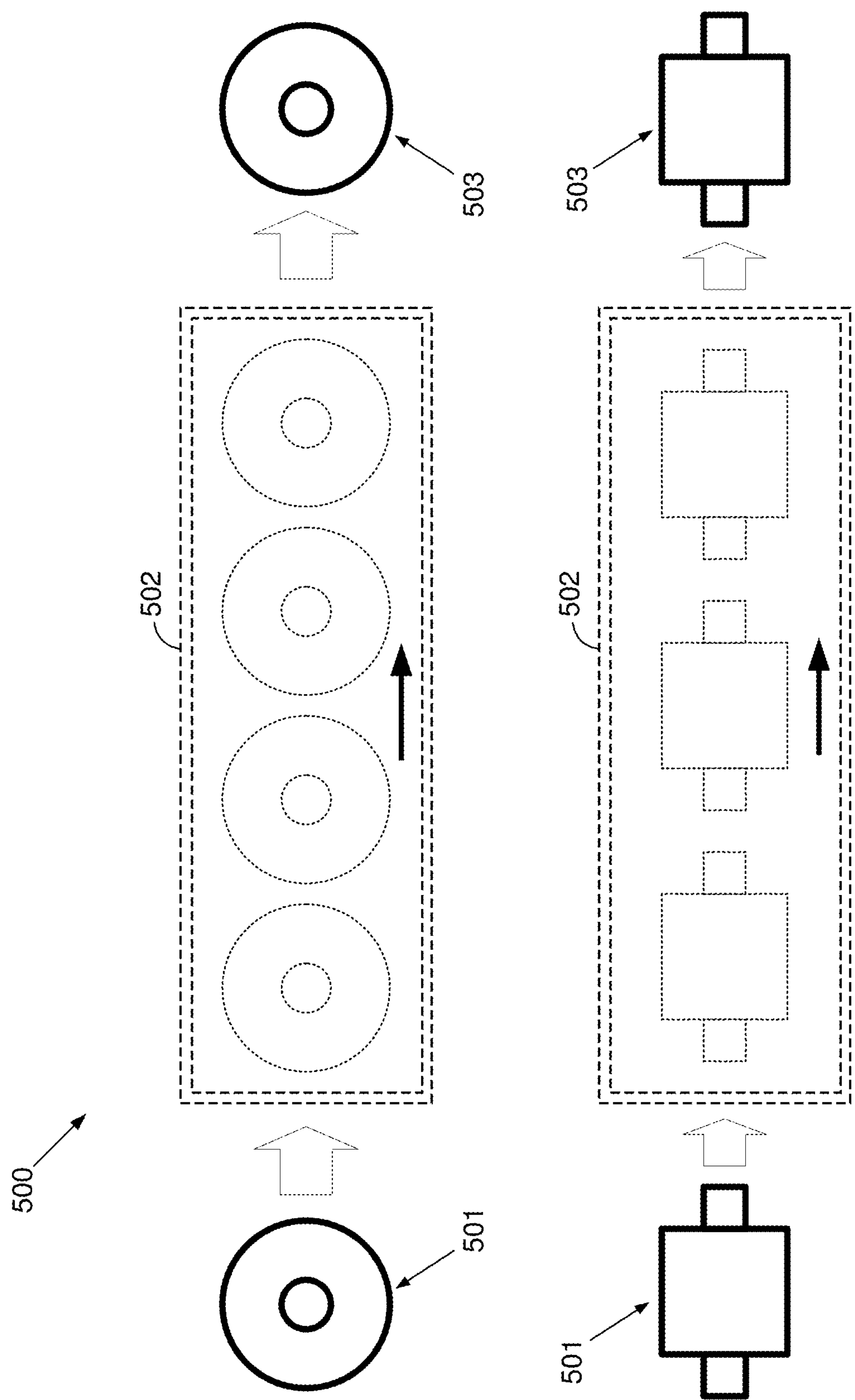
FIG. 5 illustrates a side view of an example high volume continuous batch roll-to-roll heat treatment system, in accordance with another example embodiment of the disclosure.

FIG. 5 illustrates a side view of an example high volume batch roll-to-roll heat treatment system, in accordance with another example embodiment of the disclosure. Shown in FIG. 5 is system 500, which may be used for high volume roll-to-roll electrode direct coating, based on an alternative approach than the one described with respect to FIG. 4.

An example process for providing high volume electrode direct coating, in accordance with the embodiment illustrated in FIG. 5, may include coating a pre-treated electrode mixture onto a current collector and drying and curing stages to form the precursor composite film. As shown in FIG. 5, the precursor composite film on the current collector may be rolled up into a precursor composite roll 501 on a non-reactive heat resistant core, and fed through a continuous heat treat oven 502, to undergo heat treatment (e.g., pyrolysis) of the precursor composite film. The precursor composite roll 501 then emerges from the continuous heat treat oven 502, as composite electrode roll 503, which may be used to form batteries. In this regard, while not specifically shown in FIG. 5, the system 500 may comprise suitable components for engaging precursor composite rolls, and for moving them within the system, particularly into, inside, and out of the oven 502.

In some embodiments, the heat treat oven 502 is filled with an inert or reducing gas such as argon, nitrogen, helium, 5% hydrogen in argon, 5% hydrogen in nitrogen or a mixture of these or other inert or reducing atmospheres. In some embodiments, forced or passive cooling may be designed into portions of the oven (or atmosphere isolation chambers that may be incorporated into the oven 402) to control the cooling rate of the materials. In some embodiments, the oven would have different temperature zones. In some embodiments, the precursor composite roll 501 and the composite electrode roll 503 may be placed in atmospheric isolation chambers that are on each end of the heat treat oven 502 designed to maintain internal atmosphere described above and prevent outside air from entering the oven, The temperature of the material exiting the oven has to be low enough to prevent oxidation of the current collector.

In some embodiments where the precursor composite rolls 501 are fed through the continuous heat treat oven 502, for example, as shown in FIG. 5, the heat treat length is about 5 m to about 7 m, and the heat treatment on the rolls takes about 30 min to about 110 min, 90 min to about 110 min, preferably 80 min. The heat treat output is about 1 roll/hour to about 5 rolls/hour, 4.5 rolls/hour to about 5 rolls/hour, preferably about 4.8 rolls/hour.

In some embodiments, alternative roll placement (e.g., roll orientation and/or positioning within the oven) may be supported. For example, the rolls may be oriented 90 degrees and travel through the oven end-to-end, as shown in the alternative implementation shown in FIG. 5. In this specific example, the rolls may be supported and suspended by the core on a cylindrical or otherwise tubular support.

Figure 6:
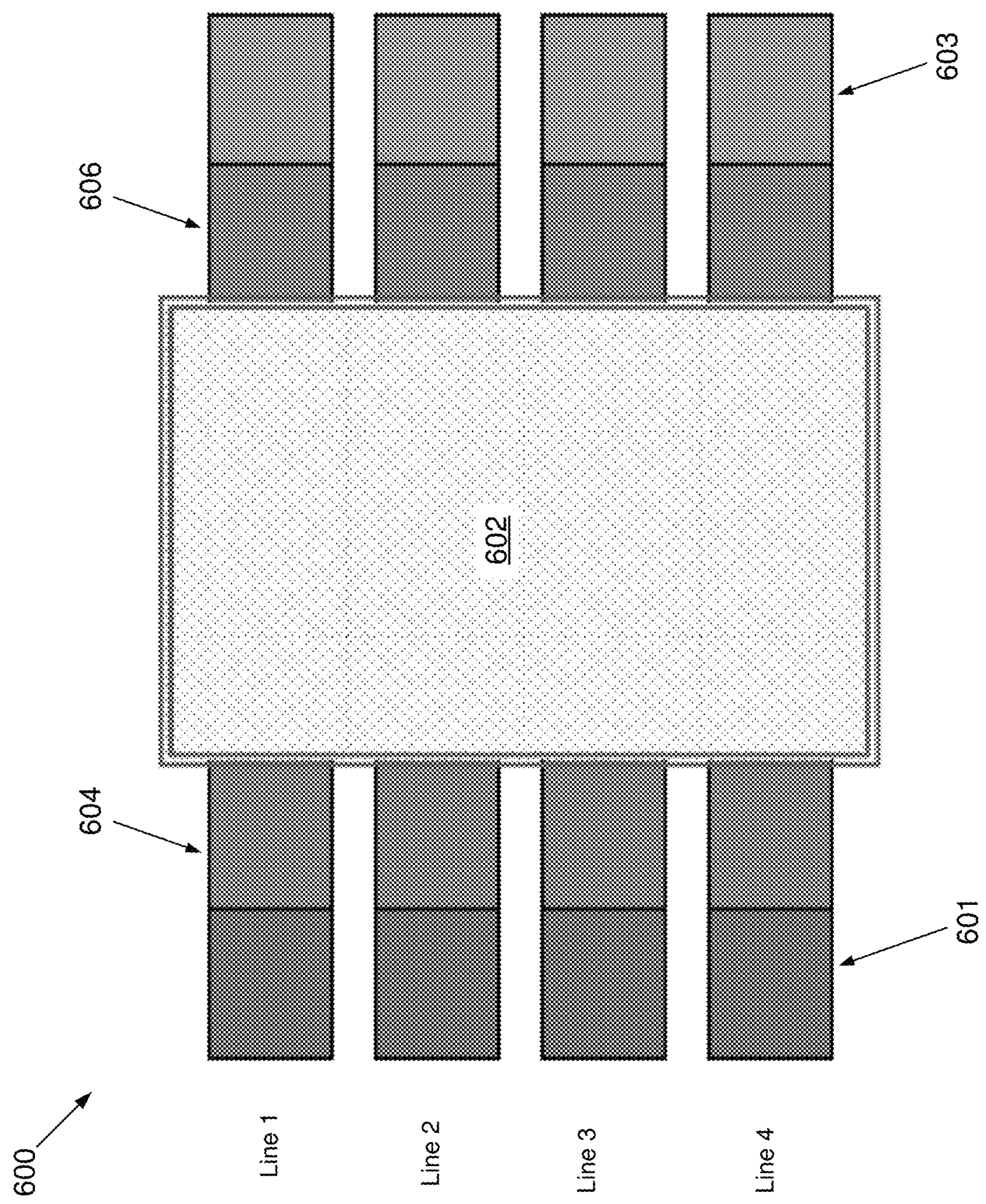
FIG. 6 illustrates a top view of an example roll-to-roll system with multiple manufacturing lines, in accordance with an example embodiment of the disclosure.

FIG. 6 illustrates a top view of an example roll-to-roll system with multiple manufacturing lines, in accordance with an example embodiment of the disclosure. Shown in FIG. 6 is system 600, which may be used for high volume roll-to-roll electrode direct coating using multiple manufacturing lines.

In this regard, in some embodiments, to further increase volumes, multiple manufacturing lines may be set up or used in a direct coating based system, such as to simultaneously produce multiple composite electrode rolls. For example, as shown in FIG. 6, such system may incorporate four manufacturing lines, with each line being implemented based on to roll-to-roll system, such as the system described with respect to FIG. 4. In some instances, some of the components used in individual manufacturing lines may be combined (or, alternatively, a single component may be used for all of the manufacturing lines).

For example, as shown in FIG. 6, the system 600 may use four (4) individual precursor composite rolls 601 (each similar to the precursor composite roll 401 of FIG. 4) feeding 4 precursor composite films 604 (each similar to the precursor composite film 404 of FIG. 4) on four (4) corresponding current collectors (not shown, as FIG. 6 is a top view, but each similar to the current collector 405 of FIG. 4). In this regard, as described with respect to FIG. 4, each current collector is coated with an electrode precursor composite film before heat treatment.

A single oven 602, which may be substantially similar to the oven 402 of FIG. 4 (but configured for applying pyrolysis to multiple films, e.g., four (4) films as shown in FIG. 6) is then used to heat treat all of the precursor composite films 604, resulting in four (4) corresponding composite electrode films 606 (each similar to the composite electrode film 406 of FIG. 4), which may be rolled into four (4) corresponding composite electrode rolls 603 (each similar to the composite electrode roll 403 of FIG. 4).

Figure 7:
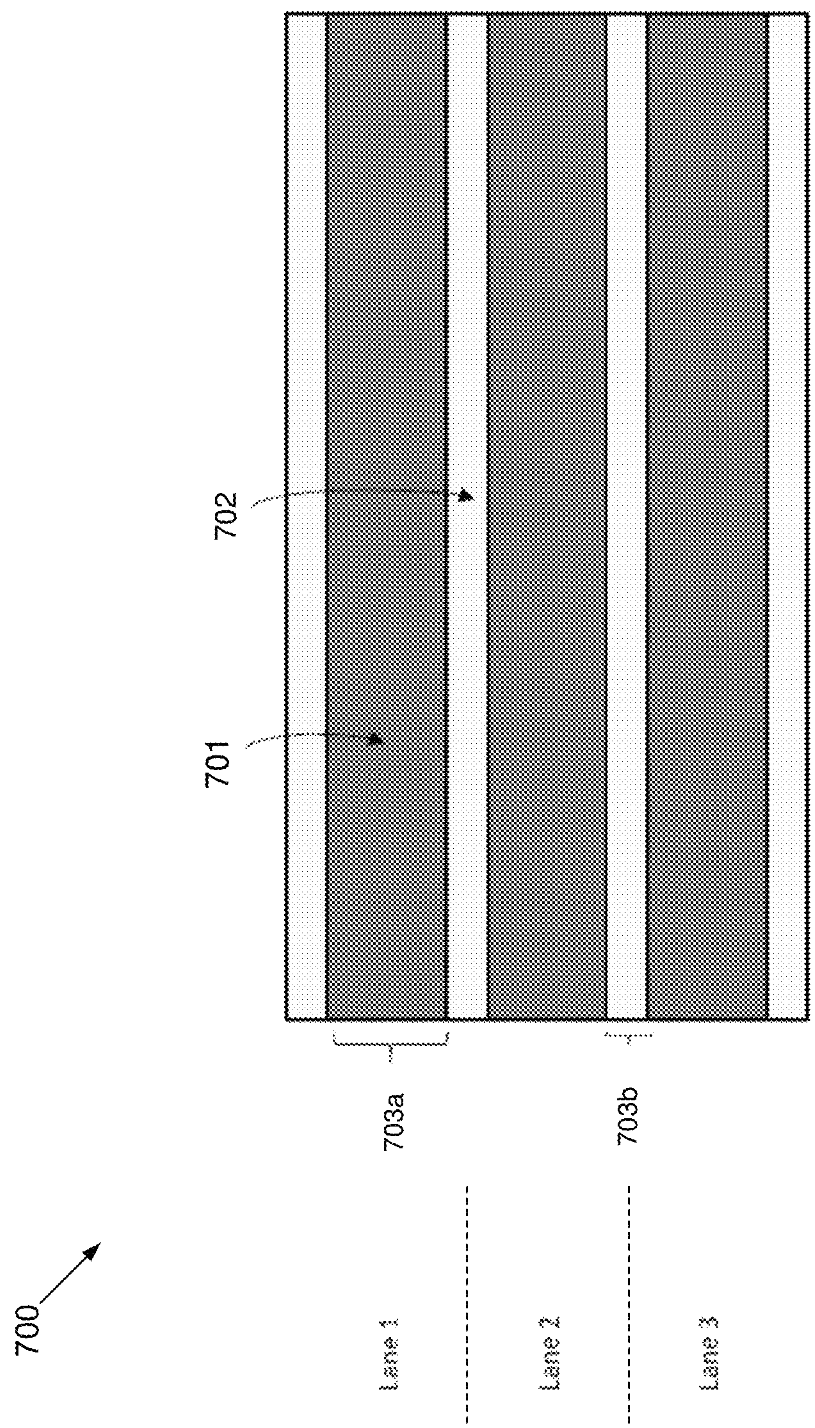
FIG. 7 illustrates a top view of an embodiment of an electrode roll with multiple mixture strips on a single current collector, in accordance with an example embodiment of the disclosure.

FIG. 7 illustrates a top view of an embodiment of an electrode roll with multiple electrode lanes on a single current collector, in accordance with an example embodiment of the disclosure.

In this regard, in some embodiments, a roll-to-roll system may be configured for making electrode rolls with multiple electrode lanes on a single current collector. This may be done by coating multiple electrode lanes on the current collector in the coating process. For example, a roll-on-roll system, such as the system described with respect to in FIG. 4, may be modified to support processing of multiple-strip rolls—e.g., where the precursor composite film on carrier film has multiple strips of precursor composite, and with the system being configured to process the film such that the final product would have multiple strips in the electrode roll.

In the example implementation shown in FIG. 7, three lanes of the mixture may be coated on a current collector 702. After going through direct coating, the three lanes of precursor composite films convert to three separate electrode composite films. The width of the carrier or the current collector may be about 300 mm to about 3200 mm, about 1300 mm to about 3200 mm. The width 703*a* of each coated mixture (and thus corresponding electrode composite film) may be between about 100 mm to about 200 mm, about 300 mm to about 800 mm, preferably about 500 mm to about 650 mm, and the distance 703*b* between each strip of coated mixture may be between about 10 mm to about 60 mm, preferably about 15 mm.

In some implementations, use of electrode rolls electrode rolls with multiple mixture strips may be combined with use of multiple manufacturing lines. For example, with reference to the system shown and described with respect to FIG. 6, to maximize throughput each of the manufacturing lines may be configured to support processing electrode rolls with multiple strips (e.g., with multiple lanes coated on a single current collector web).

While not specifically shown in FIGS. 4-7, the systems illustrated and described therein include components (e.g., hardware components, circuitry, etc.) for supporting various functions performed in these systems. The systems may incorporate, for example, suitable components (e.g., sensors, control circuitry, etc., not shown) for providing control and sensory functions for monitoring operations of the systems. The systems may also incorporate input/output subsystems (e.g., input devices, output devices, circuitry, etc.) for supporting and/or facilitating user interactions with the systems.

In any of the embodiment where there is a furnace or heat treatment oven above, the furnace could be replaced with a batch oven where an individual oven is heated and cooled with the material to be treated contained within the oven. The atmosphere, temperature, and temperature ramp could be controlled to ensure optimal results in terms of conversion of precursor material to the final composite film.

In any embodiment where there is heat treatment, materials could be processed from a long (>1 meter) film or roll into smaller pieces for thermal treatment. In some embodiments, the smaller pieces could be in the shape of the final punch size used for a stacked battery cell. In some embodiments, the pieces may be placed between rigid layers to keep the pieces flat. In some embodiments, the pieces may be stacked and aligned between the layers to keep the pieces flat. In some embodiments, the number of layers may be limited to 10, 20, 30, or 100 layers to ensure uniformity during the heat treatment process. In some embodiments, the rigid layers in between the pieces is graphite, a ceramic material, or a metal. In some embodiments, a weight may be placed on top of the stack of materials to apply pressure to the stack to ensure flat electrodes are produced. In some embodiments, the weight may be a metal such as tungsten.

As noted above, high volume electrode production solutions in accordance with the present disclosure (e.g., any of the systems described with respect to FIGS. 4-7) may be specifically configured for facilitating production of silicon-dominant anodes, as described above (e.g., with respect to FIGS. 1-3). In this regard, various aspects of the systems and/or material used in such high volume electrode production solutions may be particularly controlled and/or adjusted to ensure that such electrodes (including silicon-dominant anodes, and corresponding components in cells formed using such anodes) may be made, and may meet any predefined performance criteria.

For example, the amount of silicon in the anode may be adaptively adjusted (e.g., by adjusting or controlling the compositions and ratios of the precursor composite films). Silicon may be increased, for example, to enhance performance of the electrodes and corresponding cells. Also, in some embodiments, additives may be used (e.g., carbon additives) to improve quality of the continuous electrode films, and electrodes made using it. Further, the density of electrodes may be adaptively set or adjusted, to enhance made quality and/or performance of electrodes and cells incorporating these electrodes. In various implementations, the selection of particular material and/or ratio (or amounts thereof) may be done based on experimentation, to identify optimal selections. In some embodiments, systems and/or material used in such high volume electrode production solutions may be configured to enhance particular attributes of the electrode. For example, the composition of the electrode material may be adjusted to enhance flexibility of electrode, which is more suitable for roller based implementations.

To ensure quality of electrodes made using high volume roll-to-roll direct coating based processes (e.g., as described with respect to FIGS. 4-7), cells incorporating such electrodes (referred to hereinafter as "direct coating based cells") and performance thereof may be compared against baseline cells—e.g., cells produced using baseline process, such as continuous batch process. For example, the baseline process may include forming a precursor composite film on a carrier film, peeling the precursor composite film off the carrier, cutting the precursor composite film into appropriate size for an electrode, pyrolyzing the cut precursor composite film pieces, and then placing the pyrolyzed pieces on both sides of a copper foil coated with a layer of polyamide-imide (PAI).

For example, with respect to cell energy density, the cell energy densities of direct coating based cells compare favorably with cells incorporating electrodes made by baseline continuous batch process. This is illustrated in Table 1, which shows example energy densities of 5 L cells, and Table 2, which shows example modeled energy densities of an EV cell (550×100 mm):

TABLE 1

| | Baseline continuous batch process | Roll-to-roll transfer direct coating process |
|---|---|---|
| 4.2 V-2.75 V (0% SOC) | 598 Wh/L | 639 Wh/L |
| 4.2 V-2.75 V (100% SOC) | 556 Wh/L | 598 Wh/L |

TABLE 2

| | Baseline continuous batch process | Roll-to-roll transfer direct coating process |
|---|---|---|
| 4.2 V-2.75 V (0% SOC) | 984 Wh/L | 1022 Wh/L |
| 4.2 V-2.75 V (100% SOC) | 911 Wh/L | 946 Wh/L |

Similarly, with first cycle coulombic efficiency and voltage profile, direct coating based cells exhibited comparable or improved performance as baseline cells. In this regard, as used herein, first cycle coulombic efficiency is the capacity that was extracted from a cell divided by the capacity that was first charged into the cell. Accordingly, first cycle coulombic efficiency may be used as a metric of how reversible the chemistry is in the first cycle and as a metric of how much lithium is lost due to irreversible reactions such as surface SEI formation on the anode. Direct coating based cells produced by such systems as the ones described with respect to FIGS. 4 and 5 may perform as well performs as well the baseline cells. For example, under similar testing conditions, baseline cells may have initial coulombic efficiency (ICE) of 87.4-90.1% while direct coating based cells had ICE of 86.4-89.4%.

Figure 8:
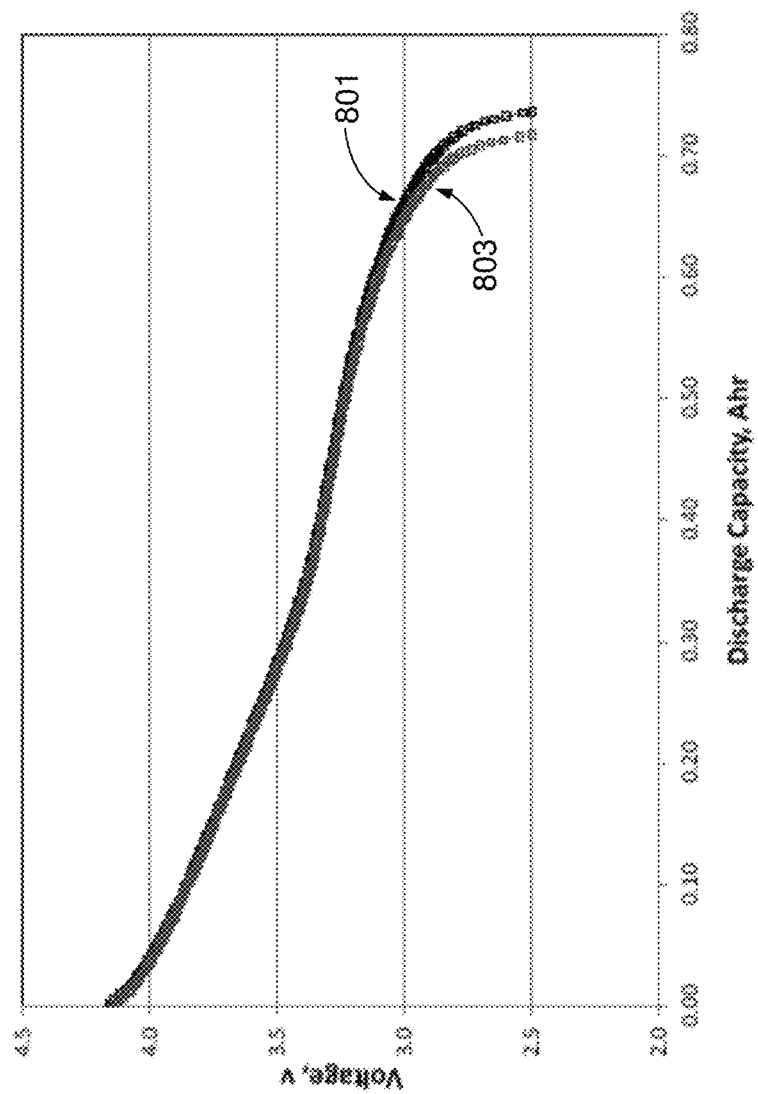
FIG. 8 is a plot illustrating voltage profile of cells that use electrodes produced using high-volume direct coating based roll-to-roll process, in accordance with an example embodiment of the disclosure.

Electrodes made using a high volume direct coating based roll-to-roll process, and direct coating based cells incorporating such electrodes, also perform well with respect to voltage profile. FIG. 8 is a plot illustrating voltage profile of cells that use electrodes produced using a high-volume direct coating based roll-to-roll process, in accordance with an example embodiment of the disclosure.

The plot shown in FIG. 8 compares voltage profile (e.g., voltage as a function of discharge capacity), as a measure of cell performance, for cells corresponding to two different groups: group 801 and group 803. In this regard, group 801 represents baseline cells, whereas group 803 represents direct coating based cells. As shown in the plot in FIG. 8, cells with electrodes made using high volume direct coating based roll-to-roll process have very similar voltage profiles as the baseline cells.

Figure 9:
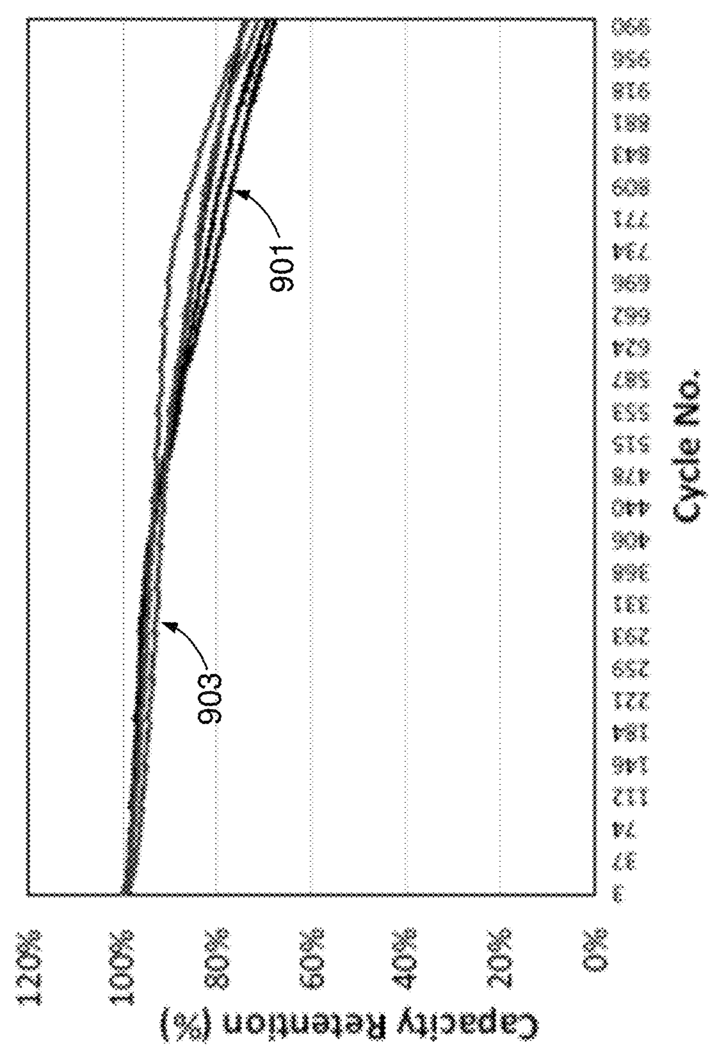
FIG. 9 is a plot illustrating capacity retention performance for cells that use electrodes produced using high-volume direct coating based roll-to-roll process, in accordance with an example embodiment of the disclosure.

Electrodes made using a high volume direct coating based roll-to-roll process, and direct coating based cells incorporating such electrodes, also perform well with respect to cycle life. FIG. 9 is a plot illustrating capacity retention performance for cells that use electrodes produced using a high-volume direct coating based roll-to-roll process, in accordance with an example embodiment of the disclosure.

The plot shown FIG. 9 compares capacity retention, as a function of number of cycles, for cells corresponding to two different groups: group 901 and group 903, as a measure of cycle life performance. In this regard, group 901 represents baseline cells, whereas group 903 represents direct coating based cells. The capacity retention for both cell groups is measured under 0.5C charge to 4.2V and 0.5C discharge to 3.3V (4.2V-3.3V (0.5C/0.5C)) test conditions.

As shown in the plot in FIG. 9, cells with electrodes made using high volume direct coating based roll-to-roll process exhibit comparable cycle life (capacity retention) performance as baseline cells.

Figure 10:
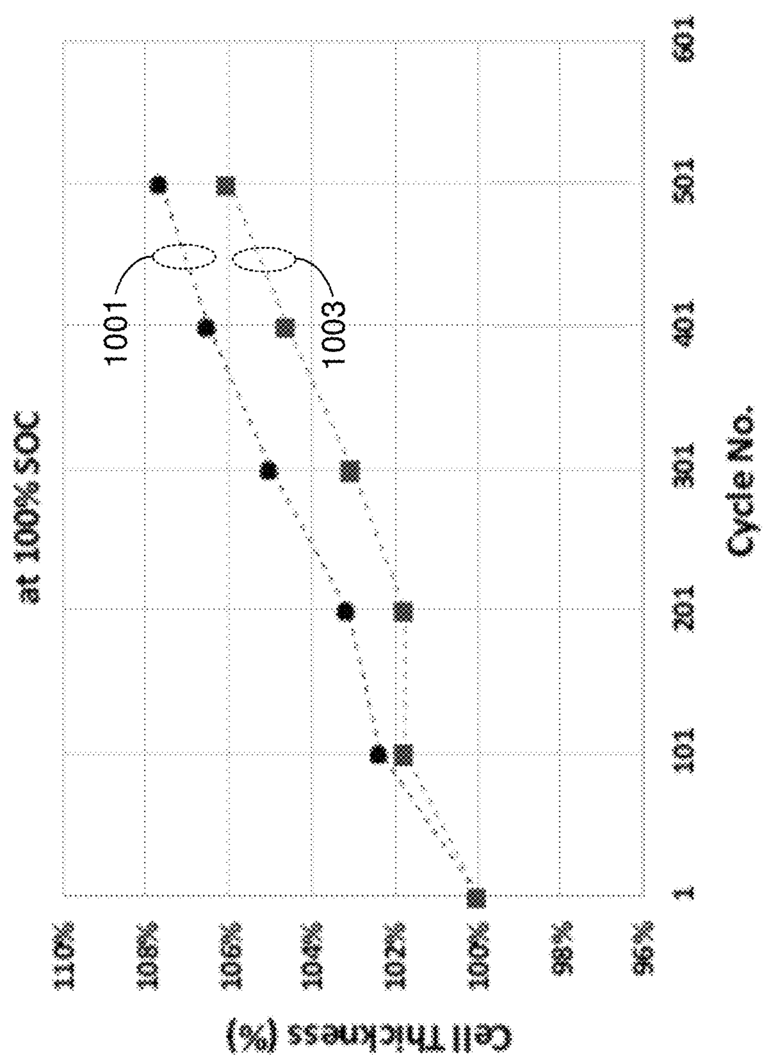
FIG. 10 is a plot illustrating cell thickness growth at 100% SOC (State of Charge) during cycle life for cells that use electrodes produced using high-volume direct coating based roll-to-roll process, in accordance with an example embodiment of the disclosure.

Electrodes made using a high volume direct coating based roll-to-roll process, and direct coating based cells incorporating such electrodes, also perform well with respect to thickness growth during cycling. FIG. 10 is a plot illustrating cell thickness growth at 100% SOC (State of Charge) during cycle life for cells that use electrodes produced using high-volume direct coating based roll-to-roll process, in accordance with an example embodiment of the disclosure.

The plot shown FIG. 10 compares cell expansion, as measure of cell performance, for cells corresponding to two different groups: group 1001 and group 1003. In this regard, group 1001 represents baseline cells, whereas group 1003 represents direct coating based cells. The cell expansion for both cell groups is measured based on changes in cell thickness against number of charge/discharge cycles.

As shown in the chart in FIG. 10, cells with electrodes made using high volume direct coating based roll-to-roll process exhibit comparable or low cell expansion compared to baseline cells.

Figure 11:
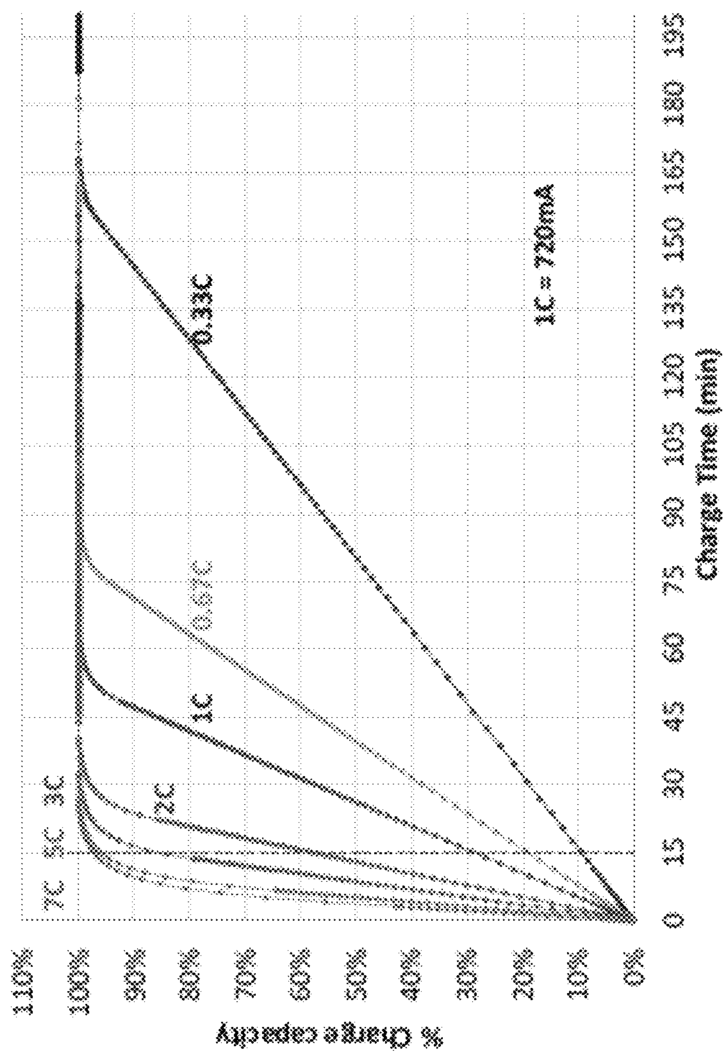
FIG. 11 is a plot illustrating charge rates for cells that use electrodes produced using high-volume direct coating based roll-to-roll process, in accordance with an example embodiment of the disclosure.

Electrodes made using a high volume direct coating based roll-to-roll process, and direct coating based cells incorporating such electrodes, also perform well with respect to fast charge capabilities. FIG. 11 is a plot illustrating charge rates for cells that use electrodes produced using a high-volume direct coating based roll-to-roll process, in accordance with an example embodiment of the disclosure.

The plot shown FIG. 11 illustrates charge rates for direct coating based cells using different C-rates (e.g., 0.33C, 0.67C, 1C, 2C, 3C, 5C, and 7C), for 1C of 720 mA, for example. Direct coating based cells show similar fast charge capability to that for the baseline cells.

Figure 12:
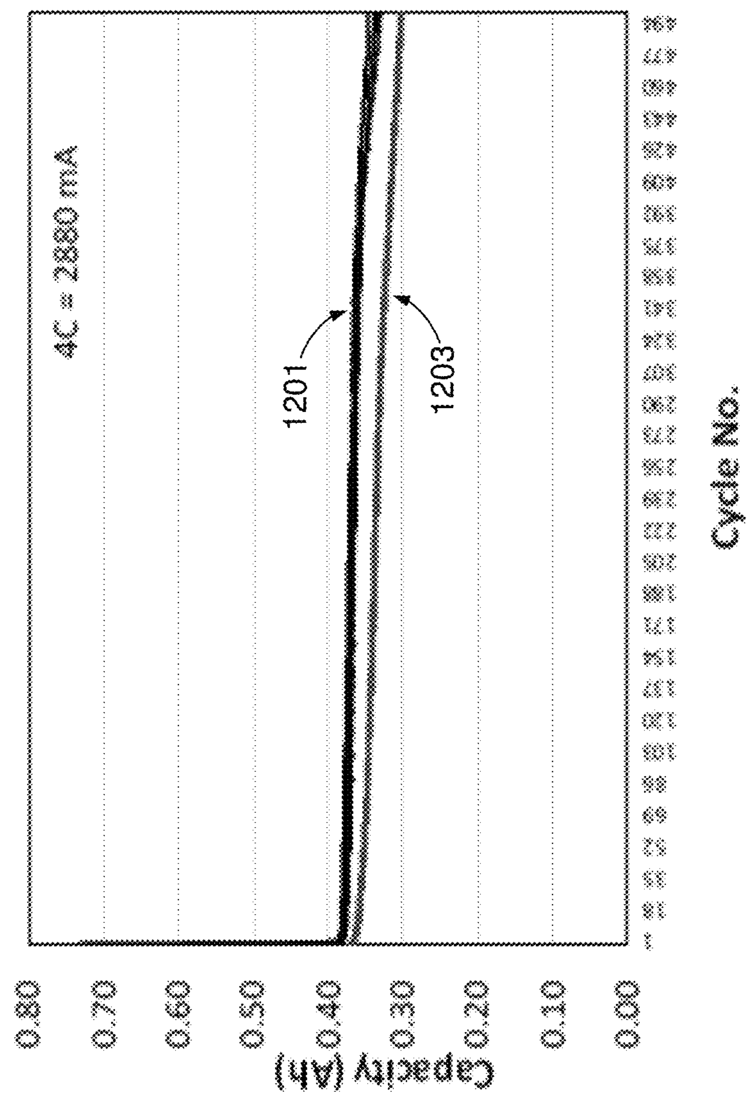
FIG. 12 is a plot illustrating capacity fade with fast charge cycles for cells that use electrodes produced using high-volume direct coating based roll-to-roll process, in accordance with an example embodiment of the disclosure.

Electrodes made using a high volume direct coating based roll-to-roll process, and direct coating based cells incorporating such electrodes, also perform well with respect to fast charge life cycle. FIG. 12 is a plot illustrating capacity fade with fast charge cycles for cells that use electrodes produced using high-volume direct coating based roll-to-roll process, in accordance with an example embodiment of the disclosure.

The plot shown FIG. 12 compares capacity fade, based on cell's capacity retention as a function of number of cycles for fast charge life cycle (e.g., 4C, where 4C is 2880 mA, for example), as a measure of cycle life performance, for cells corresponding to two different groups: group 1201 and group 1203. In this regard, group 1201 represents baseline cells, whereas group 1203 represents direct coating based cells. The capacity retention for both cell groups is measured under 4C charge to 4.2V and 0.5C discharge to 3.3V (4.2V–3.3V(4C/0.5C)) test conditions.

As shown in the plot in FIG. 12, cells with electrodes made using high volume direct coating based roll-to-roll process have similar capacity fade as baseline cells, with fast charge cycles.

Figure 13:
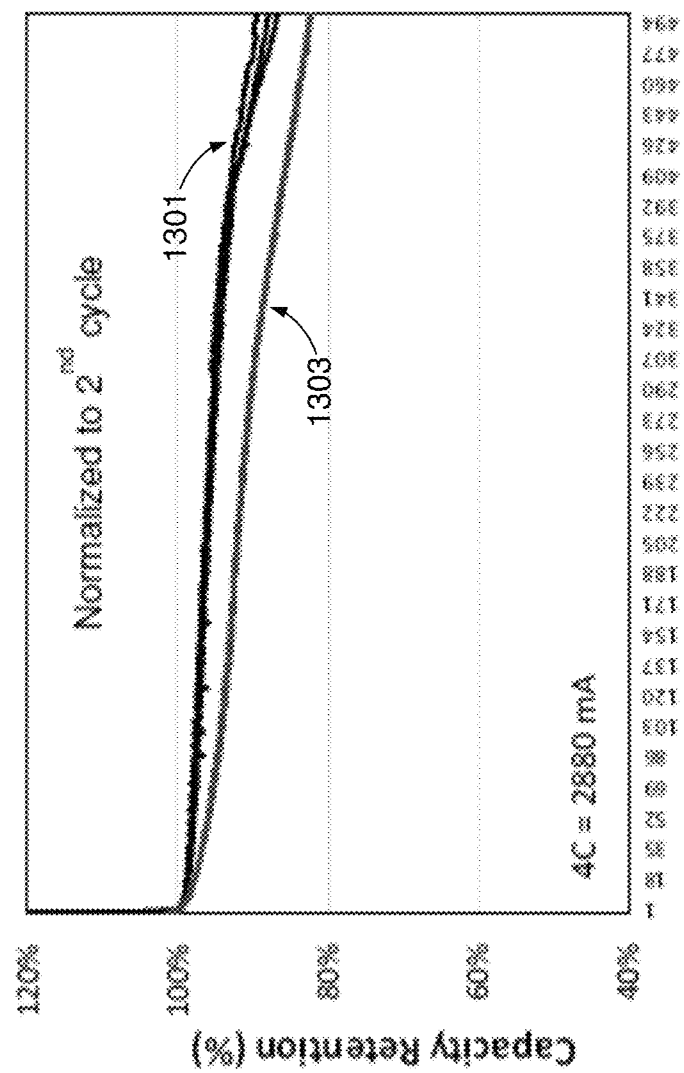
FIG. 13 is a plot illustrating normalized capacity retention with fast charge cycles for cells that use electrodes produced using high-volume direct coating based roll-to-roll process, in accordance with an example embodiment of the disclosure.

FIG. 13 is a plot illustrating normalized capacity retention with fast charge cycles for cells that use electrodes produced using a high-volume direct coating based roll-to-roll process, in accordance with an example embodiment of the disclosure.

The plot shown FIG. 13 compares normalized capacity retention (e.g., to the $2^{nd}$ cycle), as a function of number of cycles, for fast charge life cycle (e.g., 4C, where 4C is 2880 mA, for example), as a measure of cycle life performance, for cells corresponding to two different groups: group 1301 and group 1303. In this regard, group 1301 represents baseline cells, whereas group 1303 represents direct coating based cells. The capacity retention for both cell groups is measured under 4C charge to 4.2V and 0.5C discharge to 3.3V (4.2V–3.3V(4C/0.5C)) test conditions.

As shown in the plot in FIG. 13, cells with electrodes made using a high volume direct coating based roll-to-roll process have similar normalized capacity retention as the baseline cell with fast charge cycles. In this regard, carbon-silicon composite anodes may have a major advantage vs.

graphite cells in this area as graphite cells typically show very fast fade when charged at 4C due to lithium plating.

Electrodes made using a high volume direct coating based roll-to-roll process, and direct coating based cells incorporating such electrodes, also perform well with respect to structural and physical characteristics. Silicon-dominant anodes made using a high volume roll-to-roll direct coating based system (e.g., system 400 of FIG. 4), for example, perform well with respect to flexibility, which may be measured or tested based on bendability of the anodes. For example, where composite electrode films made using system 400, with a Cu foil having a thickness of 10 μm, may be sufficiently flexible that when rolled up (e.g., using rods with outer diameter (O.D.) of 2, 4, and 5 mm), they may do so easily, and without cracking.

An example system for continuous roll-to-roll electrode processing, in accordance with the present disclosure, comprises one or more components configured for receiving at least one precursor composite roll that comprises precursor composite film coated on a current collector, and a heat treatment oven for applying heat treatment to the precursor composite roll, to convert the precursor composite film into a pyrolyzed composite film coated on the current collector; with the system being configured for processing the precursor composite roll in continuous manner.

In an example embodiment, the heat treatment oven is configured to apply the heat treatment in reducing atmosphere.

In an example embodiment, the heat treatment oven is configured to create reducing atmosphere related conditions, the reducing atmosphere related conditions comprising at least one of inert atmosphere, a vacuum, flowing of one or more reducing gases.

In an example embodiment, the system further comprises one or more moving components configured for moving the precursor composite roll through the heat treat oven.

In an example embodiment, the system further comprises one or more feeding components configured for feeding the current collector with the coated precursor composite film into the heat treatment oven from the precursor composite roll.

In an example embodiment, the one or more feeding components are configured for feeding the current collector with the coated pyrolyzed composite film from the heat treat oven into a composite electrode roll.

In an example embodiment, the heat treatment oven is configured for applying heat treatment in each of a plurality of temperature zones.

In an example embodiment, the heat treatment oven is configured for applying different heat treatments in at least two different ones of the plurality of temperature zones.

In an example embodiment, the heat treatment oven is configured for applying cooling in at least one portion of the heat treatment oven.

In an example embodiment, the heat treatment oven comprises one or more atmosphere isolation chambers.

An example method for continuous roll-to-roll electrode processing, in accordance with the present disclosure, comprises applying to a current collector film, at least one precursor composite film; rolling the current collector film into a precursor composite roll; and applying heat treatment to the current collector film, where the heat treatment is configured for converting at least one precursor composite film to a pyrolyzed composite film. Applying the heat treatment comprises one or both of: applying the heat treatment to the precursor composite roll in whole, and applying the heat treatment to the current collector film, with the coated at least one precursor composite film, as it is continuously fed from the precursor composite roll.

In an example embodiment, the method further comprises applying the heat treatment in reducing atmosphere.

In an example embodiment, the method further comprises creating reducing atmosphere related conditions during the heat treatment, the reducing atmosphere related conditions comprising at least one of inert atmosphere, a vacuum, flowing of one or more reducing gases.

In an example embodiment, the method further comprises moving the precursor composite roll in whole through a heat treatment oven during the heat treatment.

In an example embodiment, the method further comprises feeding the current collector with the coated precursor composite film, from the precursor composite roll, into a heat treatment oven during the heat treatment.

In an example embodiment, the method further comprises rolling the current collector with the coated pyrolyzed composite film into a composite electrode roll.

In an example embodiment, the method further comprises applying the heat treatment separately in each of a plurality of temperature zones.

In an example embodiment, the method further comprises applying the heat treatment differently in at least two different ones of the plurality of temperature zones.

In an example embodiment, the heat treatment comprises applying cooling.

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for electrode processing, the method comprising:

applying a slurry to a current collector film, the slurry comprising silicon particles and a binder material;

drying the slurry to form a precursor composite film;

rolling the current collector film into a precursor composite roll;

applying a heat treatment to the precursor composite film and the current collector film in an environment comprising nitrogen gas, wherein the heat treatment is configured for converting the precursor composite film to a pyrolyzed composite film; and moving the precursor composite roll in whole through a heat treat oven during the heat treatment;

wherein the heat treatment comprises one or both of:

applying the heat treatment to a roll comprising the precursor composite roll in whole; and applying the heat treatment to the current collector film as it is continuously fed from the precursor composite roll.

2. The method of claim 1, comprising applying the heat treatment in a reducing atmosphere.

3. The method of claim 1, comprising creating reducing atmosphere related conditions during the heat treatment, the reducing atmosphere related conditions comprising one or more of inert atmosphere, a vacuum, and a flowing of one or more reducing gases.

4. The method of claim 1, comprising feeding the current collector with the coated precursor composite film, from the precursor composite roll, into a heat treat oven during the heat treatment.

5. The method of claim 1, comprising rolling the current collector with the coated pyrolyzed composite film into a composite electrode roll.

6. The method of claim 1, comprising applying the heat treatment separately in each of a plurality of temperature zones.

7. The method of claim 6, comprising applying the heat treatment differently in at least two different ones of the plurality of temperature zones.

8. The method of claim 1, wherein the heat treatment comprises passive cooling following pyrolysis.

9. The method of claim 1, wherein the heat treatment comprises forced cooling following pyrolysis.

10. The method of claim 1, wherein the current collector film comprises copper.

11. The method of claim 1, wherein the pyrolyzed composite film comprises 50% by weight or more of silicon particles.

12. The method of claim 1, wherein the binder material comprises one or more of: CMC, SBR, Sodium Alginate, polyamide-imide (PAI), polyacrylic acid (PAA), and polyimide (PI).

* * * * *